(12) United States Patent  
Smith

(10) Patent No.: US 6,337,924 B1  
(45) Date of Patent: Jan. 8, 2002

(54) SYSTEM AND METHOD FOR ACCURATELY RECOGNIZING TEXT FONT IN A DOCUMENT PROCESSING SYSTEM

(75) Inventor: Raymond W Smith, Campbell, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/258,451

(22) Filed: Feb. 26, 1999

(51) Int. Cl.[7] ................................................. G06K 9/46
(52) U.S. Cl. ...................................... 382/190; 382/175
(58) Field of Search ................................. 382/190, 177, 382/203, 204, 201, 202, 205, 206, 175, 209, 217, 218, 216

(56) References Cited

U.S. PATENT DOCUMENTS

| | | | | |
|---|---|---|---|---|
| 4,731,861 A | * | 3/1988 | Blanton et al. | 382/174 |
| 5,216,725 A | * | 6/1993 | McCubbrey | 382/9 |
| 5,325,444 A | * | 6/1994 | Cass et al. | 382/9 |
| 5,491,760 A | * | 2/1996 | Withgott et al. | 382/203 |
| 5,625,711 A | * | 4/1997 | Nicholson et al. | 382/224 |
| 6,104,500 A | * | 8/2000 | Alam et al. | 358/1.15 |

* cited by examiner

*Primary Examiner*—Andrew W. Johns
*Assistant Examiner*—Seyed Azarian

(57) ABSTRACT

A system and method for accurately recognizing the font of text in an image generates a bitmap of the text character represented by a font in the image and compares that bitmap to the bitmaps of characters stored in a memory. Statistics are gathered on the best matching fonts over the characters in a quantity sufficient to ascertain the most commonly occurring font. The most commonly occurring font is then selected from all fonts in the memory to represent the original image.

12 Claims, 4 Drawing Sheets

SYSTEM AND METHOD FOR ACCURATELY RECOGNIZING TEXT FONT IN A DOCUMENT PROCESSING SYSTEM

TECHNICAL FIELD

The present invention relates generally to optical character recognition, and, more particularly, to a system and method for accurately recognizing text font in a document processing system.

BACKGROUND OF THE INVENTION

Optical recognition technology has been employed in scanning devices in order to scan a printed document and convert it into an electronically editable format. Typically, a user will scan a document with a scanner that is attached to a computing device. The computing device includes software that interprets the scanned image, converts the image to a text file and then presents the text to the user in an editable electronic form.

Some OCR engines that are palt of some OCR systems include a limited degree of font recognition capability. The ones that do typically only select between a few fonts based upon whether the text is fixed pitch or proportional, and whether the text has serifs or is sans-serif. One drawback of such a system is that it prevents the reproduction of the original document in a manner that fully preserves the original layout of the document. This is so because different fonts have different characteristics, other than just serif vs. sans-serif and proportional vs. fixed pitch.

Some of the differences that can occur between fonts are: average character width, which determines the amount of space consumed by a piece of text; x-height/cap ratio, which determines whether the text has a crowded or spaced out appearance; size and shape of serifs, which determines the style or the age of the font; stroke weight, which determines the overall color of the text; and stroke weight variation, which determines the style of the text.

In the past, some OCR engines have employed pattern recognition to recognize characters in an image, but have had limited success in recognizing and identifying a particular text font. Furthermore, the reliance of a scanning system on the OCR character recognition capability severely hinders the operation of the system as a whole.

In copending and commonly assigned U.S. patent application Ser. No. 09/258,416, entitled, "SYSTEM AND METHOD FOR DETERMINING TEXT FONT IN AN OCR SYSTEM", filed on even date herewith, a system is described which uses font metrics to find a font that takes up approximately the same horizontal space as the original. Such a system achieves very high speed recognition rates, but may yield limited accuracy.

Therefore, it would be desirable to provide a way of accurately recognizing the font of text in a scanned document so that the document may be accurately reproduced.

SUMMARY OF THE INVENTION

The invention provides a system and method for quickly determining the text font in a text image.

In architecture, the present invention may be conceptualized as a system for recognizing the font of text in a document processing system, comprising a computer system having a memory in which a plurality of fonts are contained, the computer system also including a document processing system, means for receiving an image in the document processing system, the image including a plurality of text characters representing a font in the image, means for capturing each text character, each text character defined by a bitmap, means for comparing the bitmap of the captured text character with a bitmap of each of the plurality of fonts contained in the computer system, and means for selecting from the plurality of fonts from the memory the font that most closely matches the font in the image.

The present invention may also be conceptualized as providing a method for recognizing the font of text in an image, comprising the steps of: storing a plurality of fonts in a computer system having a memory, the computer system also including a document processing system, receiving an image in the document processing system, the image including a plurality of text characters representing a font in the image, capturing each text character, obtaining a bitmap for each text character, comparing the bitmap of the captured text character with a bitmap of each of the plurality of fonts contained in the computer system, and selecting from the plurality of fonts from the memory the font that most closely matches the font in the image.

The invention has numerous advantages, a few of which are delineated, hereafter, as merely examples.

An advantage of the invention is that the fonts chosen are typically those that most closely match the font in the original image.

Another advantage of the invention is that it uses the fonts available on a host computer system in order to select a font that most closely matches that in the original image.

An advantage of the invention is that it allows for the accurate recognition of text font in a text image.

Another advantage of the invention is that allows for the recognition of text font using minimal information from an optical character recognition engine.

Another advantage of the invention is that it may be implemented independently from an optical character recognition engine.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

The font recognition program of the present invention can be implemented in hardware, software, firmware, or a combination thereof. In the preferred embodiment(s), the font determination program is implemented in software or firmware that is stored in a memory and that is executed by a suitable instruction execution system. The present invention, by making use of the large selection of fonts available on a host computer system, accurately matches the font in an image to one on the host computer, resulting in the electronic document closely matching the original image.

Figure 1:
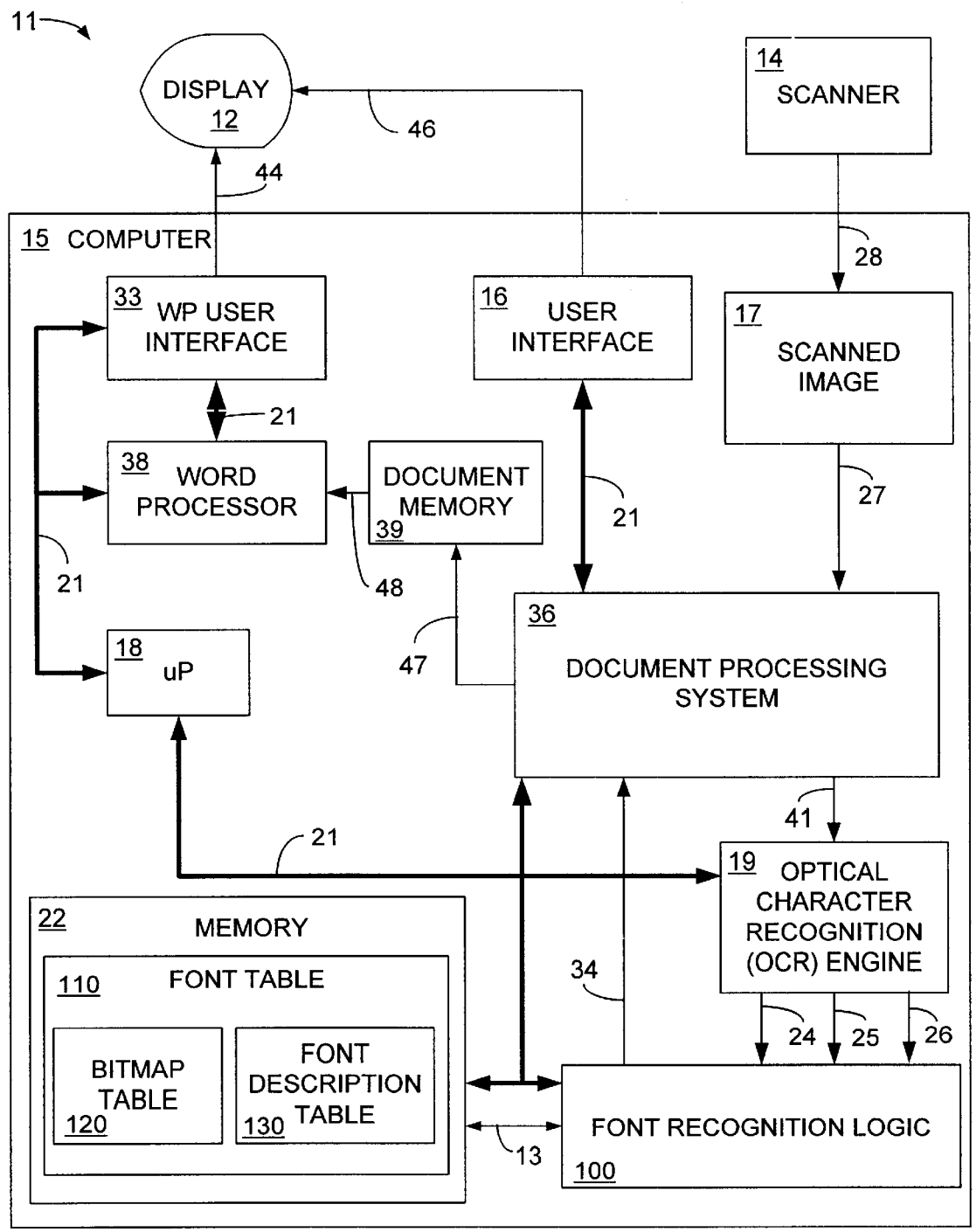
FIG. 1 is a block diagram illustrating a computer system including the font recognition logic of the present invention.

Turning now to the drawings, FIG. 1 is a block diagram illustrating a computer system including the font recognition logic 100 of the present invention. Computer 15 may be any computing device capable of executing the logic of the present invention. For example, computer 15 may be a personal computer system. Connected to computer system 15 is scanner 14. Scanner 14, as known in the art, may be used to convert an image on a printed page into an electronically readable format. For example, scanner 14 may scan a page of text creating a scanned image, and then with further processing, convert the scanned image into text characters in an electronically readable format. Computer 15 also includes user interface 16 associated with document processing system 36, of which the font recognition logic 100 of the invention forms a part. Although shown as a discrete element for clarity, font recognition logic 100 may be integrally included within document processing system 36.

Computer 15 also includes word processor 38 and word processor user interface 33 which communicate with microprocessor 18 over logical interface 21. Logical interface 21 is illustratively the communication bus that interconnects components within computer 15 and is shown fragmented for simplicity. Also included and in communication with logical interface 21 is optical character recognition (OCR) engine 19. OCR engine 19, while illustrated as an independent element, may be modularly implemented as a part of document processing system 36. Document memory device 39 is located between document processing system 36 and word processor 38. Word processor 38 illustrates a typical application program which may use the output of document processing system 36.

Also in communication over logical interface 21 is memory device 22 and font recognition logic 100 of the present invention. In accordance with an aspect of the present invention, memory device 22 further includes font table 10, which includes information relating to all of the fonts available to computer 15, which information is contained in bitmap table 120 and font description table 130. Typically, a large number of fonts are stored in memory 22 and available to computer 15. For more popular font sizes, a bitmap of each font may be stored within memory 22 in bitmap table 120. Alternatively, in the case of less frequently occurring font sizes, memory 22 includes font description table 130, which maintains a description of each font contained in memory 22. Should a bitmap of one of the less popular font sizes be desired by the font recognition logic 100, computer 15 may use the information contained in font description table 130 to render a bitmap corresponding to that font size. This will be described in further detail below.

Scanner 14 communicates with computer 15 over connection 28 by which an electronic representation of scanned image 17 is communicated to computer 15. The scanned image 17 is then supplied to document processing system 36 over connection 27. Document processing system 36 supplies the scanned image data 17 to OCR engine 19 over connection 41. OCR engine 19 supplies the input to font recognition logic 100 of the present invention, in the form of character bounding boxes over connection 24, the scanned image over connection 25, and text characters over connection 26. As is known in the art, a bounding box is the smallest rectangle that can completely enclose a particular graphic. The text characters supplied by OCR engine 19 are generated from the scanned image and the coordinates of the bounding boxes refer to the scanned image, which allows font recognition logic 100 to obtain bitmaps of the individual text characters. Font recognition logic 100 communicates with memory 22, and more specifically, with bitmap table 120 and font description table 130 over connection 13. Font recognition logic 100 supplies its output to document processing system 36 over connection 34, in the form of a selected font, bounding boxes and text characters.

Document processing system 36 takes the output of font recognition logic 100 and integrates that information with a document to be presented (i.e., the scanned document to be displayed), which may be communicated over connection 47 to document memory 39, where it is made available to word processor 38 over connection 48 for display via word processor user interface 33. Word processor interface 33 sends information to be displayed over connection 44 to display 12. Alternatively, a document containing the scanned image and the output of font recognition logic 100 may be displayed by document processing system user interface 16 over connection 46 to display 12. Alternatively, other text processing applications may be used to display the information to an end user.

Figure 2:
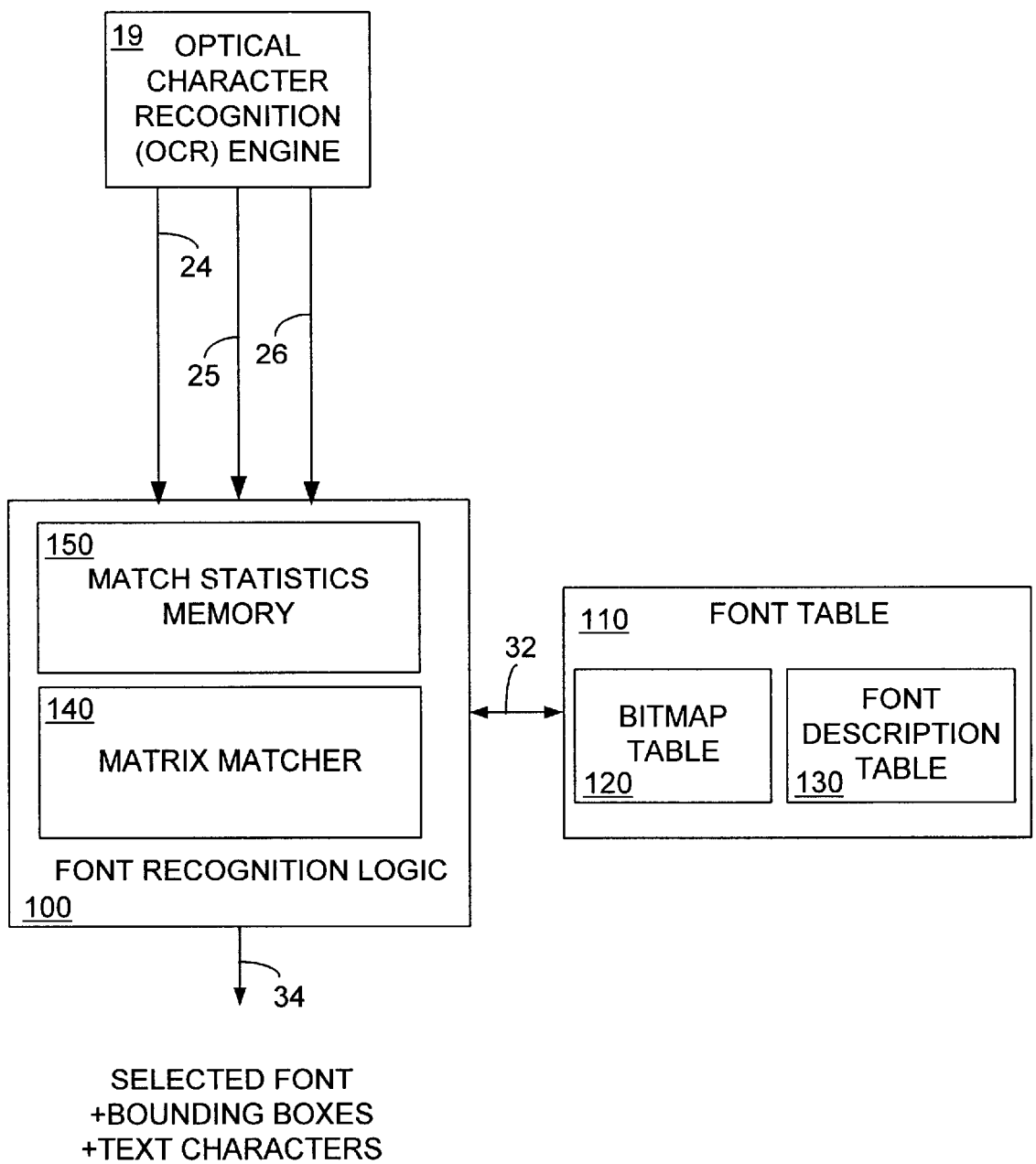
FIG. 2 is a block diagram further illustrating the font recognition logic of FIG. 1.

FIG. 2 is a block diagram further illustrating font recognition logic 100 of FIG. 1. Font recognition logic 100 includes matrix matcher 140 and match statistics table 150. Match statistics table 150 stores statistics relating to the fonts analyzed by font recognition logic 100 with respect to those in bitmap table 120 and font description table 130 in order to determine the closest font match to the font under analysis. Matrix matcher 140 communicates with font table 110 over connection 32. Font table 110 includes bitmap table 120 and font description table 130. Font recognition logic 100 receives input from OCR engine 19 in the form of bounding boxes over connection 24, the scanned image over connection 25, and text characters over connection 26. Bounding boxes over connection 24 may take the form of character bounding boxes (as opposed to word bounding boxes) and will be described in detail below. Font recognition logic 100 supplies on connection 34 the selected font plus the bounding boxes and text characters to document processing system 36 as described above.

The present invention exploits the fact that different fonts have different attributes. An example of different font attributes is illustrated with FIG. 3.

Figure 3:
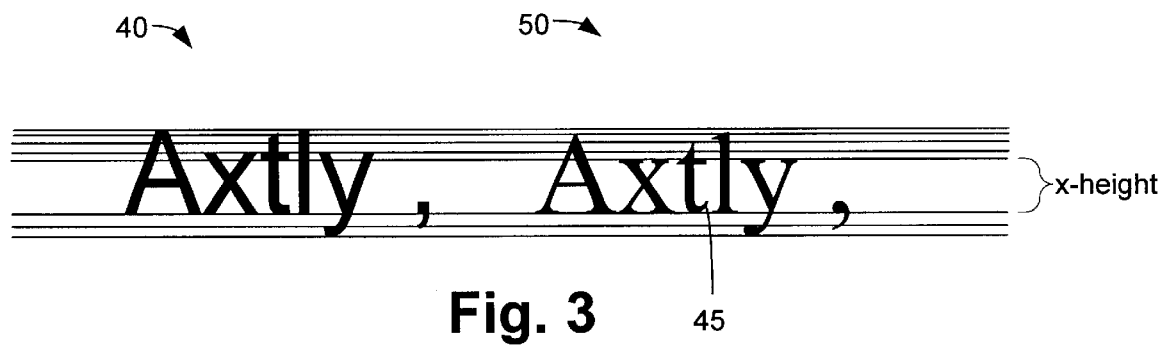
FIG. 3 is a schematic view illustrating a few of the font attributes that can be used to distinguish between two different fonts.

FIG. 3 is a schematic view illustrating a portion of the font attributes that can be used to distinguish between two different fonts. The attribute of average character width determines the space occupied by a piece of text. For example, word 40 is printed in "arial" font, while word 50 is printed in "times" font. The average character width is different from font to font, thereby determining the width of each word, and thus the amount of space occupied by the word.

Another attribute is the x-height/cap ratio. The x-height of a font (the height of a lower case letter having no ascender and no descender) is different from word 40 to word 50. Specifically the letter "x" in word 40 has a larger x-height than the letter "x" in word 50. The ratio of the x-height to the capital letter height determines whether the text has a crowded or spaced out appearance. Another attribute is whether the font contains serifs or is sans-serif. Serifs, an exemplar of which is illustrated by reference numeral 45, are the short lines or ornaments at the ends of the strokes that form the characters. Word 50 is an example of a font that contains serifs, while word 40 is an example of a font that is sans-serif. The serifs determine the style or the age of the font.

Other attributes are the stroke weight and stroke width variation. As can be seen from FIG. 3, the stroke weight and width variation for word 40 are constant, while the stroke weight and width variation for word 50 varies for each character. The stroke weight and width variation help determine the overall "color" and style of the text. The term "color" as used herein refers to the darkness or lightness of a printed page. For example, if a page of text is printed in a particular font, say "times", and then the page is printed in another font, say "bookman", and the pages are viewed from a distance, one will appear darker than the other. This effect is caused by the overall density of ink on the page and is dependent on the stroke weight and width. This is the "color" of the font.

Essentially, the present invention recognizes the font of text in an image by analyzing the font through the application of a matrix matcher. The invention analyzes a particular font (the subject font of interest on a scanned image) by creating a bitmap for each of a sample of characters from the original image and comparing, pixel by pixel, each sample character against a bitmap created for each of a plurality of fonts contained in an operating system. In a particular embodiment, the operating system is a computer 15 that has a number of fonts contained in a memory 22. For each font, a bitmap is maintained in a table 120 in common point sizes, such as 8, 9, 10, 11 and 12. For point sizes less likely to be encountered, a description of each font is maintained in a table 130 (which consumes less memory resource than the actual bitmaps), and if necessary, a bitmap for those point sizes not resident in bitmap table 120 is generated as required.

Figure 4:
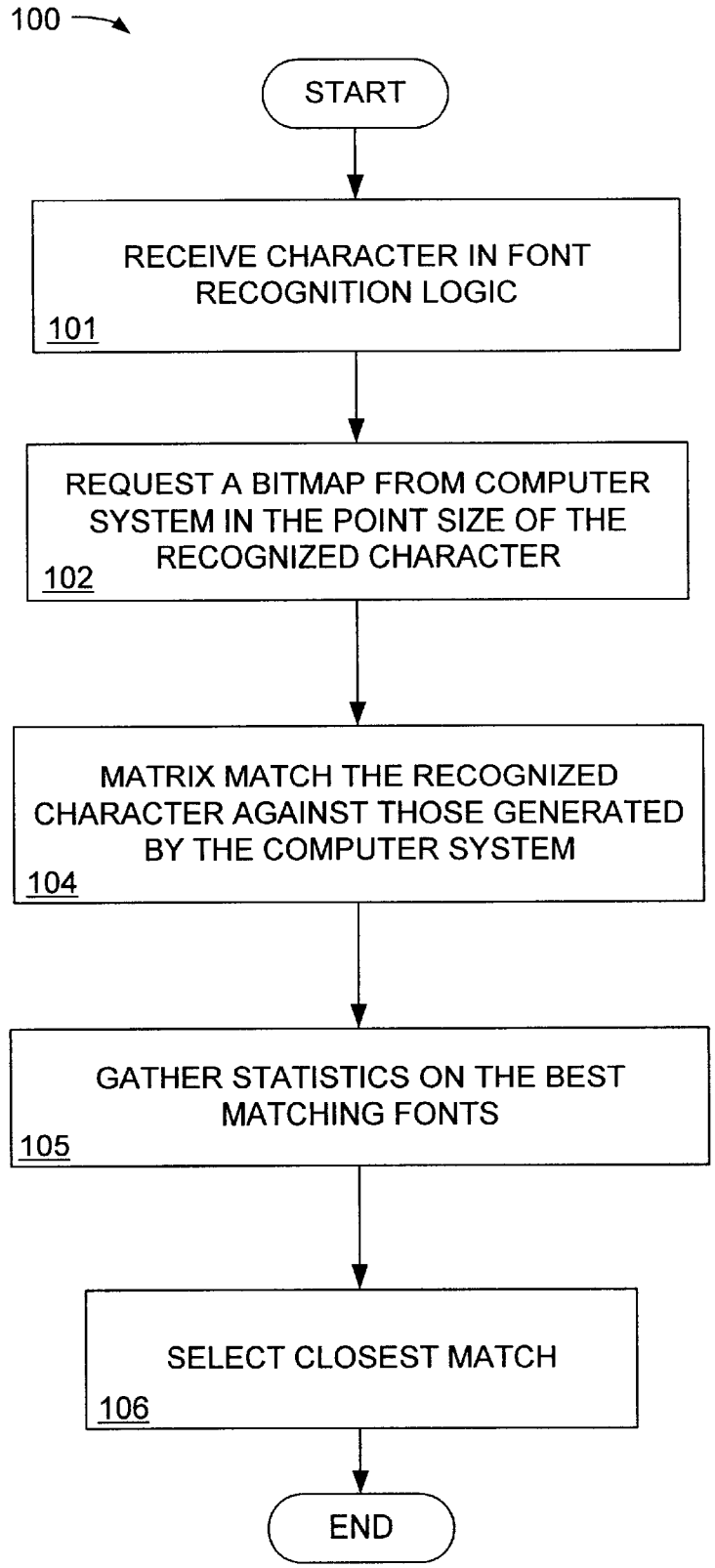
FIG. 4 is a flow chart illustrating the operation of the present invention.

FIG. 4 is a flow chart illustrating the operation of the present invention. The flow chart of FIG. 4 shows the architecture, functionality, and operation of a possible implementation of the font recognition software of FIG. 2. In this regard, each block represents a module, segment, or portion of code, which comprises one or more executable instructions for implementing the specified logical function (s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved, as will be further clarified below.

Furthermore, The font determination program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Referring again to FIG. 4, in box 101, font size recognition logic 100 (FIG. 2) receives from OCR engine 19 information including the text characters of an image 17 and character bounding boxes for each of those characters. The OCR engine identifies the character and its location. With this information, bitmaps of characters recognized by the OCR engine are obtained by cutting the characters from the image, 17, at locations specified by the bounding boxes supplied by OCR engine 19. Characters to be analyzed are chosen based upon the ability to easily distinguish the same character in different fonts. For example, the logic of the present invention chooses a subset of the character set used in the recognition language. Reflecting back to FIG. 3, the "x's" in word 40 and in word 50 are significantly different when compared pixel by pixel. Even if the point size is adjusted for the arial x (word 40) to make the size match the times x (word 50), they would still be different because of the different stroke weight, aspect ratio, and serifs. Choosing a small subset of the character set reduces processing time and improves efficiency. The subset, or, set of interest, is chosen for its ability to distinguish fonts. Certain characters such as a, e, f, g, o, t, w, x, E, G and Q tend to differ more between fonts, which means that they convey more information about their font of origin (i.e., the font of the text in the original image).

Figure 5:
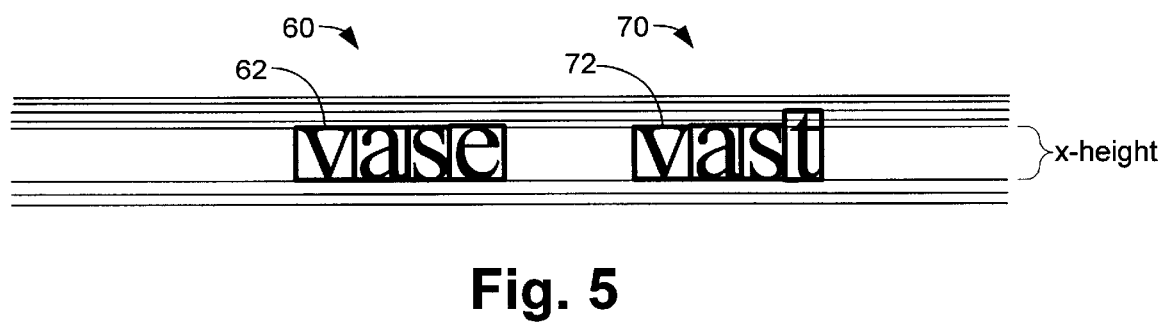
FIG. 5 is a graphical illustration of the character bounding boxes used by the font ecognition logic of FIG. 1.

FIG. 5 is a schematic view illustrating the effect of character bounding boxes on the font recognition logic 100 of FIG. 2. FIG. 5 illustrates word 60 and word 70 in which each character of each word is encapsulated within character bounding boxes 62 and 72, respectively. While only one character bounding box 62 is referenced for word 60 and only one character bounding box 72 is referenced for word 70, it should be understood that each letter in each word is encapsulated by a character bounding box.

Referring again to FIG. 4, in block 102 font recognition logic 100 requests a bitmap from font table 110, for each font in the table, in the point size of the character selected in block 101 for analysis. The bitmaps supplied by font table 110 represent ideal versions of each character in each particular font. In the case of popular point sizes, a bitmap for each font in the most likely to occur point sizes is maintained in bitmap table 120 so that it is readily available when requested from bitmap table 120 by font recognition logic 100. In the case of less frequently occurring point sizes, a bitmap in the appropriate size is generated by rendering the character into a bitmap in memory using the information in font description table 130. For example, a typical 10 point lower case "e" generates a character that is approximately 19–20 pixels in height. When selecting a character from font table 110, it is desirable to obtain the character in approximately the same size (i.e., 19–20 pixels in height).

In block 104, matrix matcher 140 analyzes the character selected for analysis in block 101 by comparing, pixel by pixel, the bitmap of the character selected for analysis from image 17 against the bitmaps of each of the fonts obtained from font table 110 in block 102.

In block 105, font recognition logic 100 gathers statistics on the best matching fonts discovered by operation of block 104. These statistics are stored in match statistics memory 150. The statistic on the best matching fonts over the characters are gathered over a sufficiently large quantity of text, such as for example, a paragraph. If there are insufficient characters from the set of interest in the text output, then the whole character set is used.

In block 106, font recognition logic 100, selects the most commonly occurring font having the closest match from font table 110. Following are two possible embodiments: 1) For each character analyzed, determine the font with the least number of different pixels (the character font) and over a paragraph, and choose the font that is the character font most often; and 2) over a paragraph, or some sufficiently large sample, sum the total number of pixels different over all the characters analyzed over all the fonts and choose the font for the paragraph with the least total number of pixels different.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

What is claimed is:

1. A system for recognizing the font of text in a document processing system, comprising:

a computer system having a memory in which a plurality of fonts are contained, said computer system also including a document processing system;

means for receiving an image in said document processing system, said image including a plurality of text characters representing a font in said image;

means for capturing each said text character, each said text character defined by a bitmap;

a matrix matcher for comparing the bitmap of said captured text character with a bitmap of each of said plurality of fonts contained in said computer system; and means for selecting from said plurality of fonts from said memory the font that most closely matches said font in said image.

2. The system of claim 1, wherein said text characters are encapsulated within character bounding boxes.

3. The system of claim 1, wherein said matrix matcher further includes means for comparing pixel by pixel, a bitmap of each said captured text character with a bitmap of each of said plurality of fonts contained within said computer system.

4. The system of claim 1, wherein said computer system stores a description of each said font contained in said memory and renders a bitmap corresponding to said font in said memory.

5. A method for recognizing the font of text in an image comprising the steps of:

storing a plurality of fonts in a computer system having a memory, said computer system also including a document processing system;

receiving an image in a document processing system, said image including a plurality of text characters representing a font in said image;

capturing each said text character;

obtaining a bitmap for each said text character;

comparing, using, a matrix matcher, the bitmap of said captured text character with a bitmap of each of said plurality of fonts contained in said computer system; and selecting from said plurality of fonts from said memory the font that most closely matches said font in said image.

6. The method of claim 5, wherein said text characters are encapsulated within character bounding boxes.

7. The method of claim 5, wherein said comparing step further includes the step of comparing pixel by pixel, a bitmap of each said captured text character with a bitmap of each of said plurality of fonts contained within said computer system.

8. The method of claim 5, wherein said computer system stores a description of each said font contained in said memory and renders a bitmap corresponding to said font in said memory.

9. A computer readable medium having a program for recognizing the font of text in an image, the program comprising logic configured to perform the steps of:

storing a plurality of fonts in a computer system having a memory, said computer system also including a document processing system;

receiving an image in a document processing system, said image including a plurality of text characters representing a font in said image;

capturing each said text character;

obtaining a bitmap for each said text character;

comparing, using a matrix matcher, the bitmap of said captured text character with a bitmap of each of said plurality of fonts contained in said computer system; and selecting from said plurality of fonts from said memory the font that most closely matches said font in said image.

10. The program of claim 9, wherein said text characters are encapsulated within character bounding boxes.

11. The program of claim 9, wherein said comparing step further includes the step of comparing pixel by pixel, a bitmap of each said captured text character with a bitmap of each of said plurality of fonts contained within said computer system.

12. The program of claim 9, wherein said computer system stores a description of each said font contained in said memory and renders a bitmap corresponding to said font in said memory.

* * * * *